Sept. 27, 1966 C. B. NENNERFELT 3,275,751

PARTY LINE ADAPTER FOR FOUR-CONDUCTOR SWITCHING SYSTEM

Filed Jan. 17, 1963 6 Sheets-Sheet 1

INVENTOR.
CARL B. NENNERFELT
BY Brown, Jackson, Boettcher & Dienner

Sept. 27, 1966 C. B. NENNERFELT 3,275,751

PARTY LINE ADAPTER FOR FOUR-CONDUCTOR SWITCHING SYSTEM

Filed Jan. 17, 1963 6 Sheets-Sheet 2

INVENTOR.
CARL B. NENNERFELT
BY Brown Jackson Boettcher & Dienner

INVENTOR.
CARL B. NENNERFELT
BY Brown, Jackson, Boettcher & Dienner

INVENTOR.
CARL B. NENNERFELT
BY

INVENTOR.
CARL B. NENNERFELT
BY Baum Jackson Bratcher & Dummer

Sept. 27, 1966 C. B. NENNERFELT 3,275,751

PARTY LINE ADAPTER FOR FOUR-CONDUCTOR SWITCHING SYSTEM

Filed Jan. 17, 1963 6 Sheets-Sheet 6

INVENTOR.
CARL B. NENNERFELT
BY Brown, Jackson, Boettcher & Dienner

United States Patent Office 3,275,751

Patented Sept. 27, 1966

3,275,751

PARTY LINE ADAPTER FOR FOUR-CONDUCTOR SWITCHING SYSTEM

Carl B. Nennerfelt, Galion, Ohio, assignor to North Electric Company, Galion, Ohio, a corporation of Ohio Filed Jan. 17, 1963, Ser. No. 252,105
17 Claims. (Cl. 179—17)

The present invention relates to telephone systems, and more specifically to a party line adapter circuit for use in connecting four-wire subscriber lines to a four-wire switching system.

The attenuation of signals transmitted over conductor paths which extend for long distances has long been a problem in the communication field, and as a result it is common practice in such installations to install amplifier means capable of providing adequate signal amplification. Although the use of hybrid devices in conjunction with amplifiers in two-wire systems has provided a partial solution to the problem, the variable nature of the exchanges used in the extension of connections over long distances in most instances makes it extremely difficult, if not impossible, to maintain hybrid balance, and as a result it is not uncommon to experience singing effects in the long distance transmission paths. It has been further recognized that amplification of signals on such paths may be more readily accomplished without such problem in four-wire systems which are comprised of two transmit conductors and two receive conductors, and as a result, there is and has been an increasing trend in the use of four-wire paths for long distance transmissions.

In certain installations, and particularly in systems which must extend over mountainous terrain or large bodies of water it is common practice to use radio wave or microwave links to span such areas. Since links of such type inherently demand the use of separate communication paths in each direction, the use of four-wire transmission paths is also somewhat conventional in such systems.

In yet other installations, it has been found that trunk traffic for the switchboard comprises a major portion of the switchboard traffic, and in such installations it is frequently more practical, from a cost standpoint, to provide a switchboard which includes four-wire switching equipment for local calls, rather than a system having two-wire substations and two-wire switching devices for use in establishing local calls, and separate four-wire switching with hybrids for use in connection to four-wire trunks.

More recently, it has also been determined that the same inherent advantages of a four-wire system provide more reliable communications in military applications.

It is thus apparent that the telephony field has long been aware of the advantages of four-wire systems, and that the use thereof is becoming more and more prevalent. Until now, however, the flexibility and utility of the four-wire system has been at a disadvantage by reason of the inability of such system to serve more than one party on a line. It is accordingly an object of the present invention to provide a novel adapter circuit which permits connection of a plurality of parties to a single four-wire subscriber line in a four-wire system, whereby an increased number of telephone substations may be serviced in a four-wire system. Further, the novel circuit makes possible the expansion of the service of existing four-wire systems.

It is a specific object of the present invention to provide a party line adapter of such type which includes novel circuitry for establishing reverting calls between the substations on the four-wire party lines.

It is yet another object of the invention to provide a novel party line adapter circuit of such type which is operable to provide selective ringing of each of the multi-subscriber substations connected to each four-wire subscriber line.

It is an additional object of the invention to provide a party line adapter which includes novel circuitry operable to transfer a connection from one subscriber station on the line to a second subscriber station on the line without releasing the connection.

It is yet another object of the invention to provide a party line adapter of such type which includes circuitry for establishing conference connections involving two or more subscriber substations connected to the four-wire subscriber line.

It is an additional object of the invention to provide a novel adapter circuit which includes a mixing circuit for connecting the substation to the four party line, and to each other in reverting and conference calls with substantially no sidetone.

According to one feature of the invention, the novel adapter circuit provides a distinctive dial tone to the calling subscriber to indicate that a connection has been completed to a party line.

According to another feature of the invention, the novel adapter circuit provides ring-back tone of a different frequency to a calling subscriber as soon as ringing current is transmitted to the desired substation on the party line.

According to one feature of the invention, whenever a calling subscriber extends a connection to a subscriber line and transmits a signal to effect selective ringing of one of the substations on the party line, if the subscriber fails to answer, the transmission of the same signal over the established connection will terminate ringing of the unanswered call, and the transmission of a further signal may be effected to yet another one of the parties connected to the line.

These and other objects and advantages of the invention will become apparent with consideration of the following description and drawings which disclose various embodiments of the invention, and in which.

Figure 1:
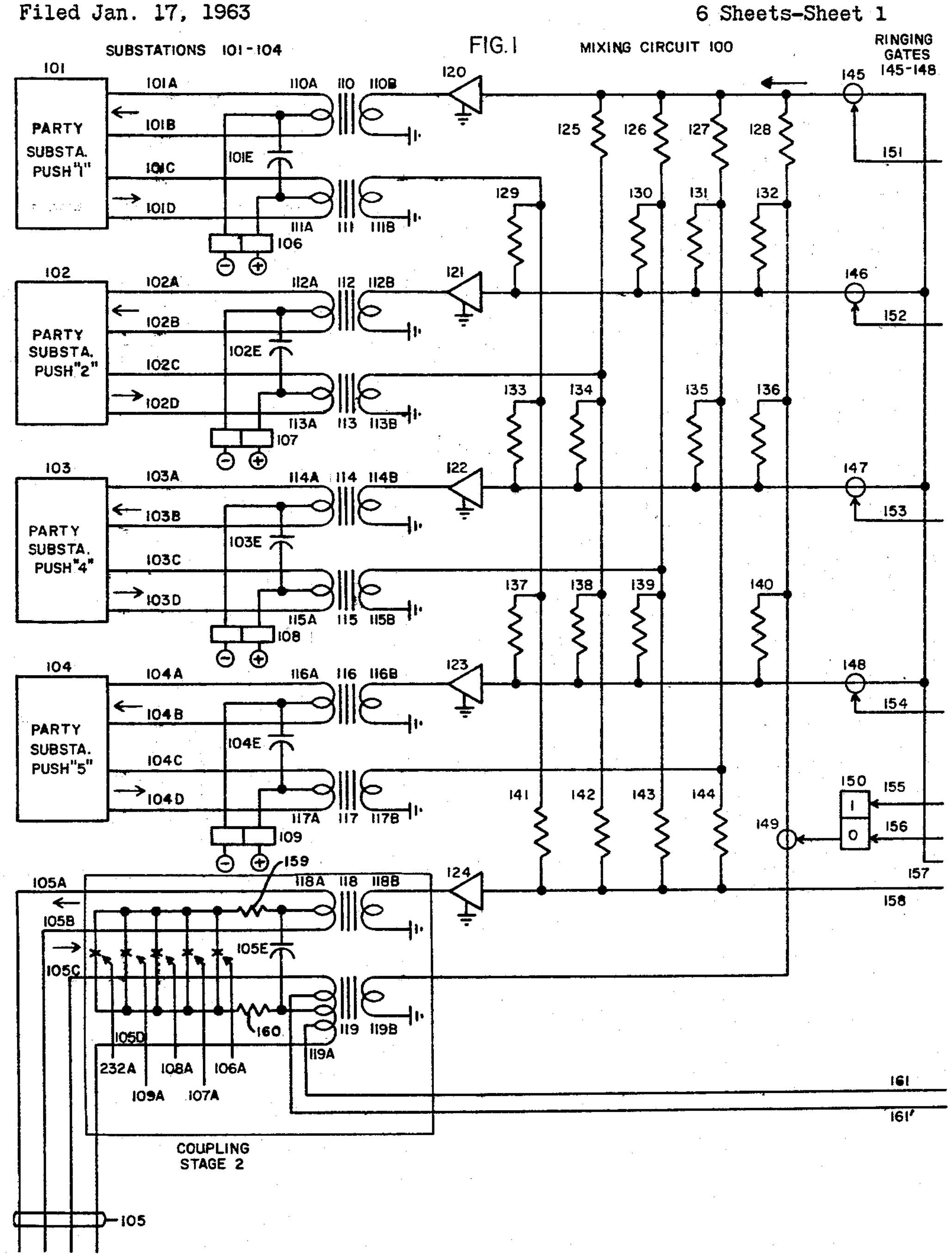
FIGURES 1, 2 and 3 illustrate the substation of a four-wire party line connected by a novel party line adapter to a time division multiplex switchboard.
Figure 2:
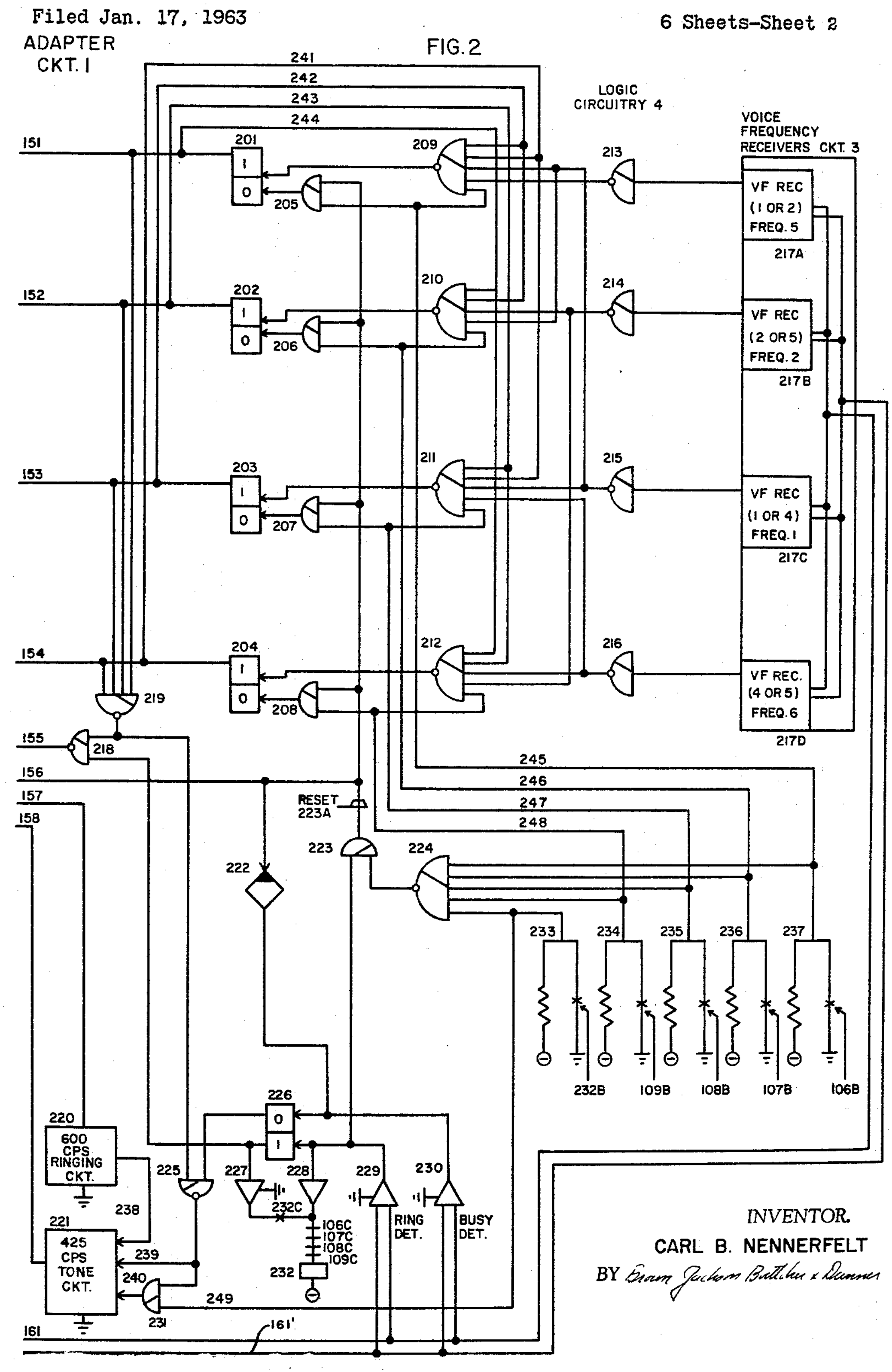
Figure 3:
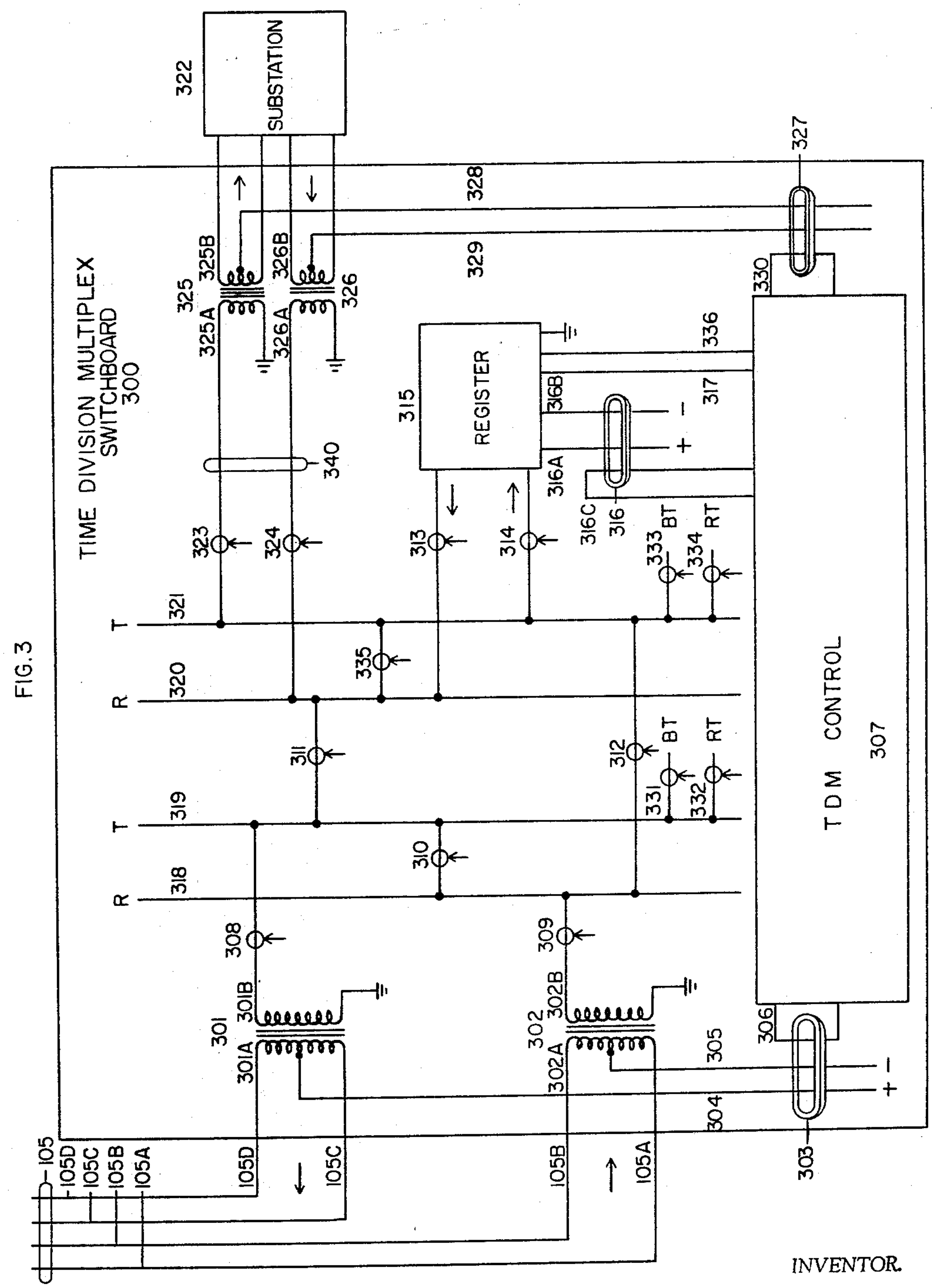
Figure 4:
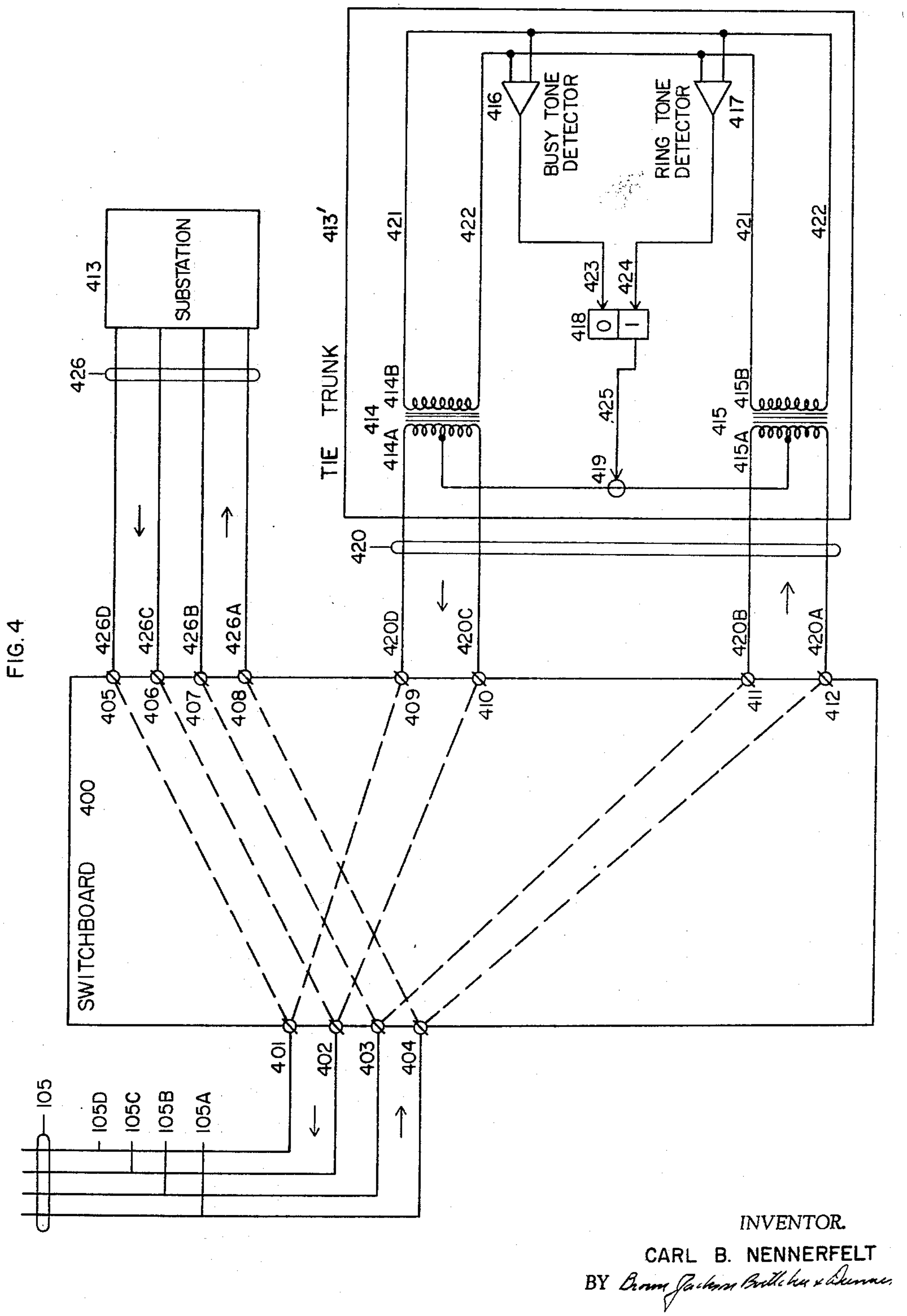
FIGURE 4 illustrates the connection of the party line adapter to switchboards which include tie trunks for establishing calls thereover.
Figure 5:
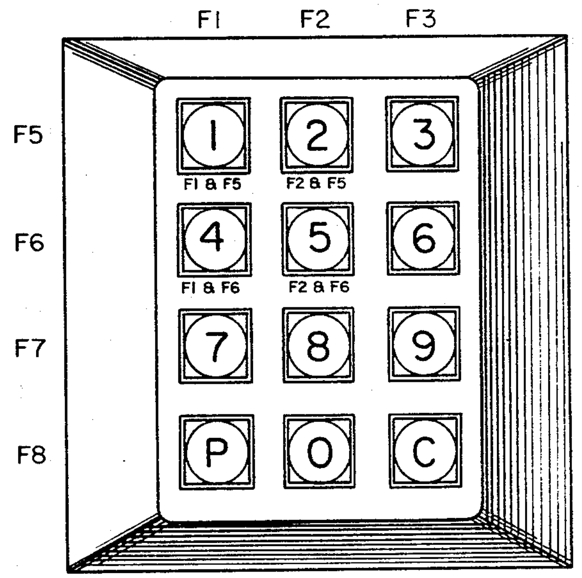
Figure 6:
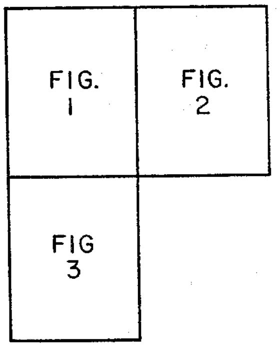
Figure 7:
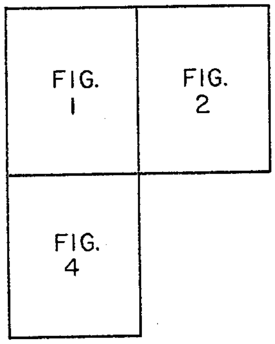
Figure 8:
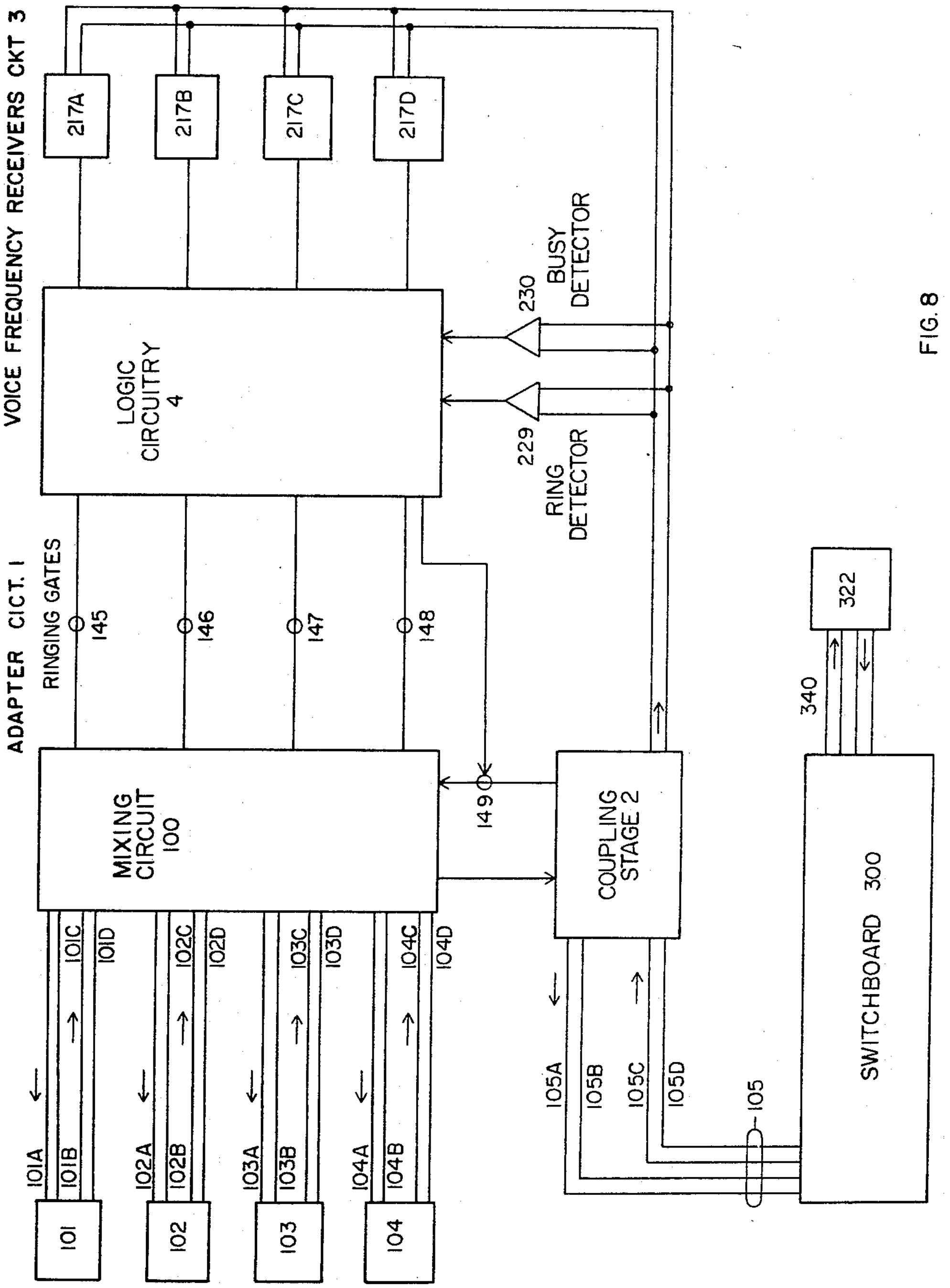

FIGURE 5 schematically illustrates one embodiment of the push button tone signalling device of the type used at the substations in the system;

FIGURE 6 illustrates the manner in which FIGURES 1, 2 and 3 are arranged to show the manner in which the adapter is used with a time division multiplex switchboard;

FIGURE 7 illustrates the manner in which FIGURES 1, 2 and 4 are arranged to disclose the manner in which the adapter is used with switchboards having tie trunks; and FIGURE 8 illustrates, in schematic block form, the novel adapter device of the invention.

GENERAL DESCRIPTION

Referring initially to FIGURE 8 of the drawings, the novel equipment is schematically shown thereat, and as there shown comprises a time division multiplex switchboard 300. A plurality of subscriber lines 101–104 are arranged to be connected over an adapter circuit 1 to a four-wire party line 105 which extends to switchboard 300. Switchboard 300 serves other subscribers, such as illustrated subscriber 322, connected thereto over subscriber line 340.

Each substation, such as 101, includes a pair of receive or incoming conductors 101A, 101B and a pair of transmit or output conductors, such as 101C, 101D coupled over a mixing circuit 100, and a coupling circuit 2 to the receive conductors 105C, 105D and the transmit conductors 105A, 105B, respectively, of party line 105.

The receive conductors 105C, 105D of party line 105 are also extended over coupling circuit 2 to a ring detector 229, a busy detector 230 and a set of four voice receiver circuits 217A–217D.

The ring detector 229, busy detector 230 and voice frequency receiver circuits 217A–217D have output circuits connected to logic circuitry 4 for the purpose of controlling such circuit, inter alia, in the operation of a set of ringing gates 145–148 to selectively extend ringing signals over mixing circuit 100 to the desired substation or substations 101–104 on the part line. Logic circuitry 4 is also operative to control connection of the communication path of the line 105 to the receive paths of the party substations 101–104.

As shown hereinafter in more detail, the logic circuitry 4 in the novel adapter circuit 1 is also connected (a) for use by the substations in the extension of calls from any of the party substations 101–104 over line 105 and the switchboard 300 to other subscribers, such as 322, (b) to control selective ringing of the subscribers' substations 101–104 on the party line and the provision of tones to the calling subscriber to indicate the status of the connection, (c) to control the selective extension of the communication path from the line 105 to the party substations 101–104, (d) for use in the establishment of reverting calls between the party substations 101–104, (e) for use in establishing conference calls including one or more of the substations 101–104, (f) and to permit transfer of a call from one substation of the group 101–104 to another substation without releasing a connection established over line 105. Other functions of the logic circuitry will be described in more detail hereinafter.

SPECIFIC DESCRIPTION

Referring now to the drawings, FIGURES 1, 2 and 3 when arranged according to the layout of FIGURE 6, illustrate the novel adapter circuit 1 in its manner of use to connect the party substations 101–104 over a subscriber line 105 to a Time Division Multiplex Switchboard 300.

With reference first to FIGURE 1, each of the "four-wire" substations 101–104, shown at the left of FIGURE 1 and connected to serve a different party, the four parties served being designated push "1," push "2," push "4," and push "5."

Each substation, such as 101, includes a tone signalling device (FIGURE 5) for use by the subscriber in the establishment of a call to a desired party as well as conventional transmitter and receiver equipment (not shown), and control means, such as a hook switch (not shown), for selectively completing the loop over conductors 101A, 101B, and 101C, 101D to the mixing circuit 100 in adapter circuit 1.

With reference to FIGURE 5, one form of tone signalling device which may be used at each of the substations 101–104 (as well as at the other substations, such as 322) served by the switchboards of FIGURE 3 or FIGURE 4 is illustrated thereat.

As there shown, the depression of any key (or button) in the top row initiates the transmission of frequency F5, the depression of any button in the second horizontal row initiates the transmission of a frequency F6, the depression of any button in the third horizontal row initiates the transmission of frequency F7, and the depression of any button in the fourth horizontal row initiates the transmission of frequency F8. Operation of button 1 thus effects the transmission of frequency F1, F5, operation of button 2 effects the transmission of frequency F2, F5, operation of button 4 effects the transmission of frequency F1, F6, and the operation of button 5 effects the transmission of frequency F2, F6.

With reference once more to FIGURE 1, the four wires or conductors connected to each substation, such as substation 101, comprise a transmit pair (indicated by arrow pointing to the right) which terminate in the primary winding, such as winding 111A, of a first transformer, such as 111; and a receive pair (indicated by arrow pointing to the left) which terminate in the secondary winding, such as winding 110A of a second transformer, such as 110. The midtaps of each winding 111A, 111B of a substation, such as 101, are connected to a potential source through a first and a second winding of an associated control or line relay, such as relay 106.

The control relay, such as 106, in each substation is connected to operate responsive to the closing of the substation hook switch (not shown) by the subscriber, and includes associated contacts 106A (see lower left of FIGURE 1) which close when the associated relay operates to complete a direct current loop over line 105 to the switchboard 300 of FIGURE 3 or 4; associated contacts 106B (see lower right of FIGURE 2) which close to control a set of logic circuitry to be described more fully hereinafter, and contacts 106C connected in the circuit of relay 232, which open to indicate to the system that subscriber line is in use. Corresponding relays 107, 108, 109 are connected in the substation 102–104, and corresponding contacts 107B–109B; and 107C–109C are connected in a similar manner.

The secondary windings 111B, 113B, 115B, 117B of transformers 111, 113, 115, 117 are connected in an outgoing or transmitting path for each of the substations to mixing circuit 100, and the primary windings 110B, 112B, 114B, 116B of the transformers 110, 112, 114, 116 are connected in the receive path of substations 101–104. The amplifiers 120–124 in the mixing circuit 100 are connected in the input path for the substations 101–104 to amplify reduced level signals received from the mixing circuit 100 prior to coupling to the associated substations.

The transmit path for substation 101 extends further over resistance 141 in the mixing circuit 100, amplifier 124, and transformer 118 to transmit conductors 105A, 105B of line 105, and switchboard 300 (FIGURES 3 and 4). The transmit path for substation 101 in the mixing circuit 100 is connected over resistances 129, 133, 137 to each of the other substation receive paths. In a similar manner, the transmit path for substation 102 in the substation is connected over resistances 125, 134, 138 to the receive path of each of the other substations 101, 103, 104, and over resistance 142 to amplifier 124. The transmit path for substation 103 is connected over resistances 126, 130, 139 to the receive paths for substations 101, 102, 104, and over resistance 143 to amplifier 124. The transmit path for substation 104 is connected over resistances 127, 131, 135, to the receive path for substations 101, 102, 103 and over resistance 144 to amplifier 124. Amplifier 124 is also connected over conductor 158 to 425 cycle tone generator 221 (FIGURE 2) for the purpose of transmitting second dial tone and ring-back tone over the transmit pair.

The receive path 105C, 105D which extends over the mixing circuit 100 to the substations 101–104 from line 105 includes primary winding 119A and secondary winding 119B of transformer 119 and gate 149, which in turn is connected over resistances 128, 132, 136, 140, amplifiers 120–124 and transformers 110, 112, 114, 116 to the receive paths for substations 101–104.

The receive conductors 105C, 105D are also connected over center taps on the two sections of primary winding 119A and conductors 161, 161' to ring detector 229, busy tone detector 230 (FIGURE 2), voice frequency receiver circuits 217A–217D.

The mixing circuit 100 also includes a set of ringing gates 145–148, each of which is connected for control by logic circuitry 4 in the gating of 600 cycle ringing current from ringing circuit 220 (FIGURE 2) to the different ones of the substations 101–104. Gate 149 in mixing circuit 100 is connected to control gating of the voice currents received over the receive pair 105C, 105D of the line 105 to the mixing circuit and the substations 101–104 are controlled by the logic circuitry (FIGURE 2).

As indicated above, the logic circuitry LC is fundamentally controlled by the voice frequency receive circuits 217; and ring detector and busy detector circuits 229, 230, substation control relays 106–109 at their contacts 106B and 107B, 108B, 109B and relay 232 at its contacts 232B (FIGURE 2).

The details of the logic circuitry are described more fully hereinafter. Briefly, however, the logic circuitry includes a set of four inverters 213–216 each of which is connected to the output of a different one of the four voice frequency receiver circuits 217A–217D. The output of each inverter 213–216 is connected to an individual one of the NOR circuits 209–212, which in turn are connected to control four flip-flop circuits 201–204 in the gating of the ringing gates 145–148 and the coupling of ringing signals selectively to the four substations 101–104 on the line 105.

The logic circuitry further includes a NOR gate 224 which is controlled by the substation relays 106–109 at their contacts 106B–109B, and a reset gate 223, controlled by gate 224 and ring detector circuit 229 to provide a general reset signal. The reset signal as generated is operative, inter alia, to prepare gates 205–208 for use in ringing the desired substation, and to later terminate ringing as a called one of the substations answers the call.

The gates 201–204 control operation of gate 219 which with gate 218 and reset gate 223 controls a flip-flop circuit 150 and gate 149 in the extension of the receive path of line 105 over the mixing circuit 100 to the called subscribers.

Gate 219 is also operative with flip-flop circuit 226 to control gate 225, and 231 in the coupling of 425 cycle tone over conductor 158 and amplifier 124 to line 105 to provide a second dial tone to the calling subscriber during the period of ringing of the called substation.

The flip-flop 226 is controlled by the ring detector 229 in the initial portion of a call to prepare the 425 cycle tone circuit for operation and is controlled by the busy detector 230 as the calling party restores to prepare the logic circuitry for reset as the called party restores.

Relay 232 is connected for operation by the ring detector 229 with detection of ringing current, and at contacts 232A indicates to the switchboard 300 that the ring as tripped, and at contacts 232B controls operation of the 425 cycle tone generator with gate 225. The operating circuit for relay 232 is opened with operation of a substation relay, such as 106, etc., whenever a call is initiated or answered by a subscriber on the party line.

The connection and operation of the other circuits in the logic circuitry 4 will become apparent with reference to the following description.

Potentials are indicated in FIGURES 1 and 2 of the drawings as +, —, and ⏚. The symbol + represents +12 v.; — represents —12 v.; and ground 0 v. The +12 v. and —12 v. potential for the party line adapter are voltages which may be provided by an A.C. to D.C. converter plugged into a commercial A.C. socket.

*Call from substation on party line 105*

When the party at substation 101 wishes to make a call through the switchboard to another party, the subscriber operates the control means at his substation, which may be a conventional hook switch, and substation relay 106 operates over the path extending from —, over the left hand winding of relay 106, the center tap of secondary 110A, conductors 101A and 101B, over the primary winding of a transformer (not shown) in substation 101 to a center tap thereon, over the closed switch hook contacts to the center tap of a secondary winding in the transformer (not shown) in substation 101 and over the secondary winding to conductors 101C and 101D, primary winding 111A to the center tap thereon, and the right hand winding of relay 106 to +. Relay 106 operates to close contacts 106A (FIGURE 1), and contacts 106B (FIGURE 2) and to open contacts 106C (FIGURE 2).

The opening of contacts 106C prevents operation of relay 232 by subscribers attempting to complete connection to the line at this time, and marks the call in the logic circuitry 4 as a call from the subscriber on the line 105 to the switchboard 300. The closure of contacts 106B extends ground to NOR circuit 224, NOR circuit 209 and OR circuit 205. (In this description ground is considered as logic 1 and negative potential as logic 0.) The purpose of the circuits controlled by contacts 106B will be described more fully hereinafter.

The closure of contacts 106A extends a loop circuit to the TDM (Time Division Multiplex) Switchboard 300 (FIGURE 3), conditioning square loop material logic core 303 to monitor line 105, the path extending from + over conductor 304, through core 303 to the center tap of transformer 301, winding 301A, conductors 105C and 105D to the center tap of transformer winding 119A, resistor 160, contacts 106A, resistor 159, center tap of transformer winding 118A, winding 118A, conductors 105A and 105B, winding 302A, the center tap of 302A and conductor 305 to —.

The TDM Control 307 (FIGURE 3) includes scanning equipment which is constantly scanning for the busy and idle condition of lines, such as line 105, such scanning being effected via conductors, such as 306. In a similar manner the TDM Control 307 scans the condition of registers, such as register 315, via conductor 316C. When the TDM Control 307 scans a line core, such as 303, and the line is idle, core 303 is switched on and off during each scan cycle. However, if the line is off-normal, the marking conductor 304, 305 prevents core 303 from switching, and the TDM Control 307 determines that the line if off-normal. The registers, such as 315, are marked and scanned in a similar manner.

Assuming that Register 315 is idle, and that the TDM Control 307 in its scanning assigns idle register 315 for use by calling line 105, the TDM Control 307, in known time division practice, effects the timed cyclic closure of gates 309, 312, and 314 in a time slot available to both highways 318 and 321 to complete a connection from the line 105 to register 315. TDM Control 307 also effects the repeated closure of gates 308, 311, and 313 in a time slot available to both highways 319 and 320 to complete a connection from register 315 to line 105.

Thereupon dial tone is transmitted from ground through a dial tone source (not shown) from register 315 through gate 313, receive highway 320, gate 311, transmit highway 319, gate 308, winding 301B to ground, inducing dial tone in winding 301A, which tone via leads 105D and 105C and winding 119A induces dial tone in winding 119B, thereby transmitting dial tone over the path which extends from ground over winding 119B, gate 149, which is normally conditioned to conduct, through resistor 128, and amplifier 120 to low impedance ground through the amplifier. The amplifier projects amplified dial tone over winding 110B to ground to induce dial tone into winding 110A and thereby couple the tone via conductors 101A and 101B to substation 101. The calling party is thus notified that push button signalling is in order. Dial tone is also extended over resistors 132, 136, and 140 (FIGURE 1) resulting in dial tone to the "ringing apparatus" of substations 102, 103, and 104, but the tone is of a frequency to which the ringing apparatus for the other stations is non-responsive.

Thereupon, the calling party pushes the buttons on his signalling device, such as shown in FIGURE 5, which are assigned to the called party, one button being pushed for each digit of the called number. As noted above, operation of each button results in two tones being transmitted in combination, the tones being transmitted from substation 101 via conductors 101C and 101D to winding 111A, thereby inducing tones into winding 111B. The tone paths further extend from ground over winding 111B, resistor 141, to low impedance ground via amplifier 124, and over winding 118B to ground. The tones are also projected incidentally over resistors 129, 133, 137, but the tones are of a low value and of a frequency to which the ringing apparatus at the other substations is non-responsive. The tones are further extended over winding 118A, and conductors 105A and 105B extend to primary winding 302A and are induced in secondary winding 302B. The path for the tone further extends from ground over winding 302B, gate 309, highway 318, gate 312, highway 321, and gate 314 to register 315 and thence to ground.

Register 315 stores the number of the called party as identified by the tone combinations received over such path, and after all of the called digits have been stored in register 315, the digits are transmitted over path 317 to the TDM Control 307.

The register also apprises the TDM Control 307 over path 317 as to the identity of gate 313 and highway 320 which are associated with the register.

TDM Control 307 then determines the inter highway gates connected to the highway which is using this time slot. In the present example, gate 311 is located, and since 311 is connected to transmitting highway 319, the marker determines that highway 319 is in use in the call. The TDM Control 307, having information as to the time slot in use, determines that of the various gates connected to highway 319, gate 308 is using such time slot, and since gate 308 is associated with the calling line 105, identification of line 105 is effected.

Thereupon the TDM Control 307 signals the register 315 over path 336 that it may be dismissed, and removes the time slot signals from gates 308, 309, 311, 312, 313, and 314.

When the TDM Control 307 is ready to complete the call to the called substation (322 in the present example), the identity of the calling and called lines is known. TDM Control 307 then projects ringing signals to substation 322 by actuating gates 333 and 323 in an available time slot. When the called party removes the receiver, the D.C. loop conditions core 327 associated with substation 322, and the control 307 in scanning determines via conductor 330 that the called party has answered. Thereupon TDM Control 307 terminates operation of gates 333 and 323 to terminate ringing. TDM Control 307 also actuates gates 309, 312, and 323 in an available time slot to establish a transmission path to called substation 322; and gates 308, 311, and 324 in an available time slot, which may be the same one or not to establish a transmission path from the called substation 322.

When the subscriber of the calling or called substation hangs up, the opening of the loop conditions the core associated therewith (303 associated with calling substation, or 327 associated with called substation), and in the continued scanning process, the TDM Control 307 detects the changed condition of core 303 or 327 and terminates operation of the connecting gates.

*Call to party substation*

It is now assumed that the party at substation 322 (FIGURE 3) extends a call to the party at substation 102 (FIGURE 1).

When the party at substation 322 removes the handset, associated core 327 is conditioned by potential on conductor 328, 329 in the manner described above. The TDM Control 307, in its scanning detects the changed condition on conductor 330 and determines that the line has gone off-hook. TDM Control 307 then connects substation 322 to an idle register, such as 315 by pulsing gates 323, 335, and 313 in an available time slot; and by pulsing gates 324, 335 and 314 in another available time slot.

The party at substation 322 receives dial tone from the register 315, and keys the digits of the directory number of line 105 into register 315 by operating the appropriate ones of the key buttons on his subset (such as shown in FIGURE 5).

After each of the called digits has been transmitted to and stored in register 315, the digits are passed over means, schematically shown as path 317, into the TDM Control 307, and the register further indicates to TDM Control 307, the identity of gate 313 and highway 320 associated with the selected register 315. Thereupon TDM Control 377 operates in the manner described to derive and store the calling line identity.

TDM Control 307 signals the register 315 over path 336 that it may be dismissed, and removes the time slot signals from gates 323, 324, 335, 313, and 314.

The lines have thus been identified to the TDM Control 307, and the TDM Control 307 is now prepared to establish the call to line 105.

Control 307 projects ringing current to line 105 by actuating gates 332 and 308 in an available time slot. Ringing tone induced from primary 301B to secondary 301A is conducted by means of conductors 105C and 105D to primary winding 119A which in turn induces ringing current in secondary 119B. A first circuit for the current extends from ground over the lower portion of winding 119B to an intermediate tap, thence over conductor 161 through Ring Detector 229 to ground. A second circuit for the current extends to relay 232, the circuit extending from ground through ring detector 229, over amplifier 228, break contacts 106C, 107C, 108C, and 109C, and the winding of relay 232 to —. Relay 232 operates.

A circuit can also be traced from ground through Ring Detector 229 to the lower portion of flip-flop 226 (logic 1 signal) causing it to generate a ground signal which is the logic "1" shown. Prior to this, in the reset condition, the lower portion was providing a negative potential, logic "0," and the upper portion was providing a ground signal logic "1."

The ground output signal (logic 1) from the lower part of flip-flop 226 to relay lock circuit amplifier 227 establishes a locking circuit for relay 232 which extends from —, over the path including the winding of relay 232, contacts 109C, 108C, 107C, 106C, 232C and through amplifier 227 to ground.

The ground output signal (logic 1) from the lower part of flip-flop 226 is also coupled to NOR gate 218 to maintain NOR gate 218 in the logic 0 output condition.

It will be observed that ground from Ring Detector 229 (logic 1) input to OR gate 223 results in a ground signal (logic 1) output therefrom which constitutes a general reset signal. The reset signal to the lower portion of flip-flop 150 causes this lower portion to transmit a logic 1 signal to gate 149 to maintain gate 149 operated. The reset signal as coupled by gate 223 to OR gates 205–208 controls these gates to transmit a logic 1 signal to the associated flip-flops 201–204, and gates 201–204 are thus maintained in the reset condition. In such condition, the upper portion of each gate provides an output logic 0 signal to NOR gate 219, which in turn maintains the output of NOR gate 218 as a logic 0 signal.

As spurts of ringing current occur, the leading edge of reset signals from OR gate 223 controls leading edge detector 225 to provide logic 1 signals output therefrom which tend to reset flip-flop 226. The ringing signal, however, over-rides and nullifies the signal and flip-flop 226 remains in its set condition.

As relay 232 operates, it is effective at contacts 232B to connect ground (logic 1) to one input of NOR gate 224, which provides negative potential (logic 0) to OR gate 223; at contacts 232A establishes a metallic loop to switchboard 300 to condition core 303 and thereby indicate over conductor 306 to the TDM Control 307 that the ring has been tripped.

As a result of the ring being tripped, Ring Detector 229 changes its output to OR gate 223 to negative potential (logic 0). With both inputs at negative potential (logic 0), and the general reset signal is removed.

Relay 232 at its contacts 232B also connects ground (logic 1) to the input of OR gate 231, which connects ground (logic 1) to the 425 cycle tone generator, causing this generator to emit dial tone over the path from ground through the 425 cycle tone generator, lead 158, and amplifier 124 to ground. Amplifier 124 transmits amplified dial tone over the primary windings 118B of transformer 118 to ground, inducing tone current in secondary winding 118A which travels back over the established connection to the calling party as "Second Dial Tone" to indicate a connection has been completed to the desired line.

At this time the calling party at substation 322 depresses key "2" to select the desired party on the line (push "2" substation 102 in the present example). As key "2" is depressed, frequencies 2 and 5 are coupled over primary winding 326B (FIGURE 3) to induce tone in secondary winding 326A. The tone passes through gates 324, 311, and 308 in the pulsed time slots to primary windings 301B, and is induced in secondary 301A for transmission over conductors 105C and 105D to primary winding 119A (FIGURE 1). The tone is further induced in secondary winding 119B, and coupled over conductor 161 to the Voice Frequency Receiver Circuit 217 which actuates voice frequency receivers 217A and 217B to provide a ground signal to inverters 213 and 214. The inverters both give out a negative signal (logic 0) to NOR gate 210, ground signals—logic 1—normally extend from inverters 213, 214, 215, and 216 as inhibiting signals to NOR gates 209, 210, 211, and 212 respectively.

Since the other inputs to gate 210 are at negative potential (logic 0) as a result of flip-flops 201, 202, 203, and 204 being reset, and, assuming that contacts 101B are open because the party at the substation has not answered, gate 210 provides a ground signal (logic 1) to flip-flop 202 causing this flip-flop to be set as shown. The upper part of this flip-flop 202 provides a ground signal (logic 1) over conductor 152 to gate 146 which establishes a conduction path from the 600 cycle ringing circuit 220 over the path which extends from ground over ringing circuit 220, conductor 157, gate 146, and amplifier 121 to ground. Amplifier 121 transmits an amplified ringing current over the path extending from ground over amplifier 121, primary winding 112B of transformer 112 to ground, thereby inducing ringing current in secondary winding 112A which passes over conductors 102A and 102B to the ringing apparatus of substation 102 which generates an audible ringing signal for the called subscriber.

The logic 1 output from the upper part of flip-flop 202 to gate 219 causes the output from gate 219 to be logic 0. This logic 0 input to NOR gate 225 together with the logic 0 from flip-flop 226 causes the output of gate 225 to be logic 1. This logic 1 input to OR gate 231, causes the output over conductor 240 to be logic 1, maintaining the 425 cycle oscillator in operation. The logic 1 from gate 225 on conductor 239 causes the 425 cycle oscillator to be responsive to on-off ring interrupt signals of the 600 cycle Ringing Circuit which are transmitted over conductor 238 to tone circuit 221, whereby the 425 cycle tone transmitted over conductor 158 to the calling subscriber is changed from steady dial-tone to ring-back tone.

The logic 1 output from flip-flop 202 is also coupled over conductor 243 to gates 211 and 212 to inhibit the gates so that any further tone signals received by Voice Frequency Receiver Circuit 217 will not affect the signalling operation.

When the called party at substation 102 removes the receiver to answer the call, relay 107 operates, and at its contacts 107A closes a circuit in parallel with contacts 232A which hold the loop closed to the switchboard, and at contacts 107B (FIGURE 2) extends a logic 1 signal (ground) to NOR gate 224, and also over conductor 246 to OR gate 206 which transmits a logic 1 signal to the lower part of flip-flop 202 to reset the flip-flop, whereby the output of the upper part of flip-flop 202 becomes logic 0.

The logic 0 output signal of gate 202 transmitted over conductor 152 turns off gate 146 to terminate the gating of ringing signals to substation 102. The logic 0 signal output of gate 202 is also transmitted to gate 219 which switches its output to logic 1. Logic 1 output from gate 219 has no effect on NOR gate 218 at this time in that the other input to gate 218 has a logic 1 signal thereon. The logic 1 signal from gate 219 has no effect on gate 225 at this time in that the second input of 225 has logic 1 thereon.

Relay 107 in operating is also effective at its contacts 107C to release relay 232. As relay 232 restores, the opening of its contacts 232A (FIGURE 1) has no effect at this time in that contacts 107A are closed in parallel therewith, and the opening of contacts 232B (FIGURE 2) has no effect on NOR gate 224 at this time in that contacts 107B have maintained a logic 1 signal to this gate. Contacts 232B do, however, cause the lead 249 input to OR gate 231 to transfer to logic 0 to thereby terminate the signal output of tone circuit 221 to the called line and substation.

If the calling party hangs up first, the opening of the D.C. loop at substation 322 (FIGURE 3) in effect transmits a call terminating signal to the control 307 to condition core 327, whereby TDM Control 307 in scanning determines that the calling party has replaced the receiver. As a result thereof, TDM Control 307 terminates operation of gates 324, 311, 308, 309, 312, and 323; and operates gates 331 and 308 to project Busy Tone over transformer 301 to the line 105, and over transformer 119 (FIGURE 1) to a circuit extending from ground (logic 1) over the Busy Tone Detector 230 (FIGURE 2) to the upper part of flip-flop 226 to reset the flip-flop 226 to provide logic 1 output signal by the upper portion and the logic 0 signal by the lower portion. The logic 0 signal to NOR gate 218 has no effect at this time as the output of gate 219 to gate 218 is logic 1. The logic 1 output of gate 226 to NOR gate 225 has no effect at this time as the second input to gate 225 has logic 1 thereon.

When the called party at substation 102 hangs up, relay 107 releases, and at contacts 107B (FIGURE 2) changes the input of NOR gate 224 to logic 0, whereby gate 224 transmits the logic 1 signal to OR gate 223 which reestablishes logic 1 signal on its output as the general reset signal. Relay 107 at its contacts 107C prepares a circuit to relay 232, and at its contacts 107A (FIGURE 1) opens the loop to the switchboard to mark core 303 in a manner to indicate to TDM Control 307 that the called party has hung up. TDM Control 307 thereupon terminates operation of gates 331 and 308.

If the called party at substation 102 hangs up first, relay 107 releases, and at its contacts 107A opens the loop to the switchboard conditioning core 303, whereby the TDM control 307 in scanning, will detect to the signal indicating that the called party has hung up. TDM control 307 operates to terminate the operation of the gates concerned in the connection, and to operate gates 333 and 323 to give the calling party busy tone. When the calling party hangs up, core 327 is marked, as noted above, and TDM control 307 in scanning determines via conductor 330 that the calling party has replaced his receiver. TDM control 307 thereupon discontinues operation of gates 333 and 323.

Relay 107 at its contacts 107B marks the associated input of NOR gate 224 with the logic 0 signal, and gate 224 transmits logic 1 signal to OR gate 223 to control gate 223 to provide a logic 1 signal output. Leading edge detector 222 responds to such change of signal from gate 223, and provides a momentary logic 1 signal to the upper portion of flip-flop 226 to reset the flip-flop without clamping.

*Call transfer*

If as has just been described, a call is made from a substation 322 to the party at substation 102, and during conversation between the calling and called parties, it is determined that the calling party should speak with the party at one of the other substations on the party line 105, the party at substation 102 advises the calling party to dial the "push" digit assigned to such party. Assuming, for example, that the call is to be transferred to the party at substation 104, the calling party is instructed to push the key "5." The party at substation 102 will, however, have to stay on the line until the party at substation 104 answers.

When the calling party pushes his key 5, frequencies 2 and 6 are projected over the established path and are induced from primary winding 119A into secondary winding 119B, and tone passes over the circuit extending from ground through the lower portion of secondary 119B, conductor 161, and voice frequency receivers 217B and 217D to ground. Voice frequency receivers 217B, 217D transmit logic 1 signal to inverters 214 and 216 which in turn transmit logic 0 signal to NOR gate 212. As all other inputs to gate 212 have the logic 0 signal connected thereto, gate 212 gives out the logic 1 signal to flip-flop 204. As a result thereof, 204 flips and the upper part thereof transmits the logic 1 signal to gate 148, which turns on to couple the 600 cycle ringing signal to the party at substation 104. The logic 1 signal transmits to NOR gate 219 and controls the gate to give out the logic 0 signal to NOR gate 225 which gives out the logic 1 signal to lead 239 and to gate 231 to reinitiate ring-back tone to substation 322.

When the party at substation 104 answers, relay 109 operates, closing contacts 109A in parallel with 107A, opening contacts 109C (107C are also operated at this time), and closing contacts 109B, whereby a logic 1 input to NOR gate 224 is established in addition to the logic 1 from contacts 107B.

When the party at substation 102 ascertains that the party at substation 104 has answered, and replaces his handset relay 107 releases and opens its contacts 107A, but relay 109, however, at contacts 109A maintains the loop to the switchboard 300. Relay 107 at its contacts 107C closes, but relay 109 at its contacts 109C holds the circuit to relay 232 open. Relay 107 opens contacts 107B, but contacts 109B keep a logic 1 signal input to NOR gate 224, so that the output thereof does not change.

Relay 109 at its contacts 109B couples a logic 1 signal to OR gate 208 which in turn transmits a logic 1 signal to the lower section of flip-flop 204 to reset the flip-flop, and the upper portion thereupon transmits a logic 0 signal over conductor 154 to cut off gate 148, and thereby disconnect the ringing signal from substation 104.

This process can be repeated to transfer the call to other substations on the line, if desired.

Release is, in pattern, the same as that already described. If the called party does not answer, the calling party again depresses the same push-button and the ringing will cease.

*Reverting call*

The novel adapter is also operative to establish reverting calls between substations on party line 105, and as an example, the operation of the adapter in establishing a call from substation 101 to substation 104 is now described.

When the handset is lifted at substation 101, the substation 101 is connected to an idle register, such as 315, in TDM switchboard 300, and dial tone is returned in the manner described above.

The calling party now keys the digits 02 into register 315, and the TDM control 307 connects the outgoing and incoming pairs of the substation together.

More specifically, as a result of receiving the digits 02 and other information as previously described over the path schematically indicated as 317, the TDM control 307 informs the register that it may release, and the register 315 changes the condition of the loop circuit which extends over conductors 316A and 316B to core 316. When the TDM control 307, in scanning, observes that the register 315 has become idle, it terminates the cyclic operation of the gates which have set up a connection between the substation 101 and register 315, and proceeds to set up a connection in which gates 308, 310 and 309 are pulsed in a time slot available to highways 318 and 319. The calling party will notice a sizeable increase in sidetone at such time.

Thereupon the calling party pushes his key labeled 5, and tones of frequencies 2 and 6 will issue from his substation over conductor 101C and 101D to primary winding 111A which induces tone in the secondary winding 111B of transformer 111. A path for the tone current can now be traced from ground over the secondary winding 111B, resistor 141, amplifier 124 to ground, and the amplified tone passes over the path which extends from ground through amplifier 124, primary winding 118B of transformer 118 to ground. Tone induced in secondary winding 118A of transformer 118 passes over conductors 105A and 105B to primary winding 301A of transformer 301 (FIGURE 3) associated with line 105 in the TDM switchboard 300, inducing tone in the secondary winding 301B of transformer 301. A path for this tone in the assigned time slot can be traced from ground over secondary winding 301B, gate 308, highway 319, interhighway gate 310, gate 309 and secondary winding 302B of transformer 302 to ground.

Tone induced in the secondary winding 302A of transformer 302 passes over conductors 105A and 105B to primary winding 119A of transformer 119. Tone induced in the secondary winding 119B is extended over a path extending over the secondary winding 119B and conductor 161 to voice frequency receivers 217B and 217D and ground. As a result thereof, voice frequency receivers 217B and 217D couple logic 1 signals to NOR gates 214 and 216 to cause these gates to give out logic 0 signals to NOR gate 212. As all other inputs to gate 212 have logic 0 signals thereon, gate 212 transmits the logic 1 signal to flip-flop 204 causing it to flip from its reset state, and to transmit the logic 1 signal from its upper part to NOR gate 219. Gate 219 operates to transmit the logic 0 signal to NOR gate 218, and as logic 0 signal also obtains on the other input of NOR gate 218, gate 218 gives out a logic 1 signal to the upper portion of flip-flop 150, causing 150 to flip from its reset position, so that the lower part gives out the logic 0 signal to gate 149 which is cut off to reduce the level of sidetone.

The logic 1 signal transmitted from flip-flop 204 via conductor 154 to gate 148 renders gate 148 conductive, and the substation 104 thereupon receives 600 cycle ringing current from source 220.

When the output from gate 219 changes from logic 1 to logic 0, NOR gate 225 transmits logic 1 signal over lead 239 to the 425 cycle tone circuit 221, which is thereupon made responsive to the interrupt rate signal received over conductor 238 from ringing circuit 220. The logic 1 signal output from gate 225 also causes OR circuit 231 to transmit the logic 1 signal to tone circuit 221 to enable tone generation. Thus ring-back tone traverses a path from ground circuit 221, over lead 158, resistors 144 and 125, and amplifier 120 to ground. A path for amplified ring-back tone can be traced from ground through amplifier 120, primary winding 110B of transformer 110 to ground, and ring-back current induced in secondary winding 110A passes over conductors 101A and 101B to substation 101. Since, at this time, contacts 106B provide a logic 1 signal to associated NOR gate 209 to prevent flip-flop 201 from being set, the calling party cannot dial his own number (i.e., "1") and receive ringing current to his own headset.

If the called party at substation 104 does not answer, the calling party may, of course, hang up. In such case, the relay 106 restores and at contacts 106A releases the line towards the switchboard, and at contacts 106B transfers the input signal to gate 224 from logic 1 to logic 0. Thereupon gate 224 transmits the logic 1 signal to OR gate 223 which, in turn, provides the logic 1 general reset signal.

The calling party may, however, decide to call another party on the party line. In that case he would again press his key labeled "5." This burst of tone would be received by tone receivers 217B and 217D over the path described above. Tone receivers 217B, 217D transmit the logic 1 signal to inverters 214 and 215 which then provide a logic 0 output signal to NOR gate 212 as before, and NOR gate 212, having all its inputs at logic 0, causes its output to be logic 1, and flip-flop 204 (which is an alternating flip-flop) flips back to its reset condition, turning off gate 148 to terminate the ring-back tone.

The adapter is then in condition to again receive a party selection digit "2," "4," or "5."

When the called party "5" answers, relay 109 operates and at contacts 109B resets the associated flip-flop, such as 204 for party 5, and ringing ceases. Relay 109 at contacts 109A closes a circuit parallel to contacts 106A, and conversation can ensue. The talking path established for transmission of the voice currents of the party at substation 101 to the party at substation 104 extends from the transmitter of substation 101 over conductors 101C, 101D over the primary winding 111A, and secondary winding 111B or transformer 111, resistor 137 and amplifier 123 to gound. Amplified voice currents then pass over the transformer 116, and conductors 104A and 104B to substation 104 and the receiver at station 104.

The talking path established for the transmission of the voice currents of the party at substation 104 to the party at substation 101 extends current from the transmitter of substation 104 over conductors 104C and 104D, the transformer 117, resistor 127 and amplifier 120 to ground. Amplified voice currents then pass over amplifier 120, transformer 110 and conductors 101A and 101B to the receiver in substation 101.

When the last party hangs up, the loop to the switchboard is opened to condition core 303, and as control 307 in scanning detects the change in conductor 306 (which occurred as the result of the line being returned to the idle condition) it discontinues the operation of gates 308, 309, and 310.

The last substation to release causes NOR gate to transmit the logic 1 signal to OR gate 223 which provides the logic 1 general reset signal. Gates 205–208 responsively provide the logic 1 signal therefrom to associated flip-flops 201–204 to insure that these flip-flops will be reset.

*Party line conference*

In the case of a conference call between parties on line 105, the operation would be the same as that described for a reverting call up to the point where two parties are in communication (i.e., as in the example of the call from substation 101 to substation 104). The inclusion of the remaining substations in the call would follow a similar pattern, the circuit being arranged to allow ringing of only one party at a time. If a party does not answer, the substation can be released by again keying the number. It should be noted that no conference master exists in this type of operation, and any one of the parties has equal signaling capability.

Assuming, for example, that substation 101 has called substation 104 and that the parties are in communication, substation 101 or 104 may then call in another substation by keying the assigned code, such as, for example, by keying digit 4 to include substation 103 in the call.

Frequencies 1 and 6 then pass over line 105 to the switchboard 300 (FIGURE 3), through gates 309, 310, and 308, transformer 301, back over line 105 to the transformer 118 (FIGURE 1) and via conductor 161 to voice frequency receivers 217C and 217D. The receivers 217C, 217D operate in response to receipt of frequencies 1 and 6 respectively, to give out the logic 1 signal to inverters 215 and 216, which, in turn, each give out the logic 0 signal to NOR gate 211 which causes flip-flop 203 to become set. As a result, the upper part of flip-flop 203 gives out the logic 1 signal on conductor 153 to gate 147 to cause same to conduct ringing currents to substation 103. The logic 1 signal on conductor 153 also extends over conductor 242 to inhibit NOR gates 209 and 210, and to NOR gate 219 to cause the gate to give out the logic 0 signal to NOR gate 225. As a result, NOR gate 225 transmits the logic 1 signal over conductor 239 to OR gate 240, which gate puts out the logic 1 signal to conductor 240. With the logic 1 signal on both of conductors 239 and 240, ring-back tone is transmitted by circuit 221 over conductor 158 and the resistors to both of the substations 101 and 104.

When the party at substation 103 answers, relay 108 operates, and at is contacts 108A closes a circuit in parallel to contacts 106A and 109A; at its contacts 108C further opens the circuit of relay 232; at its contacts 108B provides the logic 1 signal input to OR gate 207, which in turn gives the logic 1 signal to the lower part of flip-flop 203 to reset the flip-flop. The upper portion of flip-flop 203 transmits the logic 0 signal over conductor 153 to turn off gate 147 and thereby trip the ring. The logic 0 signal of flip-flop 203 is also coupled to gate 219 to terminate ring-back tone, and is coupled over conductor 242 to gates 209 and 210 to remove the inhibition placed thereon.

The method described can be repeated to include each and all of the parties on the line in the conference.

As the parties hang up, relays 106–109 restore and contacts 106A, 107C, etc., in the circuit of relay 232 are closed to prepare for the next operation of 232; and contacts of the group 106B, 107B, 108B, and 109B associated with parties in the conference open to transfer associated inputs to associated gates of the group 205, 206, 207, and 208 to logic 0, which action is without effect at this time. When the last of these contacts open, all inputs to NOR gate 224 will have logic 0 thereon, and gate 224 will provide the logic 1 signal to gate 223 which in turn transmits the logic 1 signal to the general reset lead 223A.

As the parties hang up, and release relays 106–109, contacts of the group 106A, 107A, 108A, and 109A associated with the conferees are also opened, and the contacts associated with the last party to restore, opens the loop to the switchboard to condition core 303. When the TDM Control 307, in scanning, engages conductor 306 to detect the fact that line 105 is idle, the control 307 terminates operation of gates 308, 309 and 310.

CALLS TO SWITCHBOARD HAVING TIE TRUNKS (FIGURE 4)

A. *Call from party substation 101 to substation 413*

It is now assumed that the party at substation 101 wishes to make a call through a switchboard, such as switchboard 400, shown in FIGURE 4, to a party at a substation, such as 413, served by such switchboard.

When the party at substation 101 removes his handset, relay 106 operates as before described to close contacts 106A, 106B, and 106C and the adapter operates in the manner described.

The closure of contacts 106A extends a loop circuit to switchboard 400 via terminals 401, 402, 403, and 404, and the TDM Control means (not shown) associated with the switchboard 400 determines that the line has gone off-normal.

Dial tone is fed back from the switchboard 400 over terminals 401 and 402 to advise the calling party that the called number may be keyed into the switchboard 400.

The party at substation 101 keys the directory number of substation 413 and the frequencies are transmitted over terminals 403 and 404 into switchboard 400, which automatically rings substation 413 over terminals 407 and 408.

When the called party answers, the ring is tripped at switchboard 400, and the switchboard completes transmission connections schematically indicated between terminals 401, 402, 403, 404, and 405, 406, 407, and 408 respectively.

When the calling or called substation hangs up, the opening of the calling or called loop signals the switchboard 400 which interrupts the connections, giving the busy tone to the remaining substation until the remaining party replaces the handset. Busy tone to substation 101 would be fed over terminals 401 and 402, and to substation 413 over terminals 407 and 408.

B. *Call to party substation 102 from substation 413*

The party at substation 413 (FIGURE 4) calls the party at substation 102 (FIGURE 1) by removing the handset to complete a loop over terminals 405, 406, 407, and 408 to a switchboard 400. Thereupon switchboard 400 feeds dial tone over terminals 407 and 408 to substation 413 advising the calling party to key the called number.

The party at substation 413 keys the directory number of line 105 over terminals 405 and 406 into switchboard 400 and, as a result of receipt of the called directory number, switchboard 400 projects ringing current over terminals 401 and 402 to line 105.

Ringing current 400 extended over terminals 401 and 402 and conductors 105C and 105D to the adapter of FIGURES 1 and 2 effects the same operation in the adapter as described above when ringing current was transmitter from switchboard 300, and the ring is accordingly tripped by the adapter.

Switchboard 400 extends communication paths schematically shown from terminals 401, 402, 403, 404 to terminals 405, 406, 407, and 408 respectively; and the adapter returns "second dial tone" over conductors 105A and 105B which via terminals 403 and 404, 407 and 408 to substation 413 to advise the calling party to key the code for the party on the line (i.e., digit "2").

Thereupon the calling party at substation 413 depresses key "2." As a result thereof, frequencies 2 and 5 (for push "2" substation 102) are transmitted from substation 413 over terminals 405 and 406 to terminals 401 and 402, to the adapter. The adapter operates to ring substation 102 in the manner described with reference to a call from substation 322 to 102. Ringback tone transmitted from the adapter over conductors 105A and 105B, terminals 404 and 403, 408 and 407, is extended to the substation 413. When the called party at substation 102 removes the receiver, the adapter operates in the manner described and the ring is tripped.

If the calling party at substation 413 hangs up first, the opening of the loop controls the switchboard 400 to project busy tone over terminals 401 and 402 to the adapter which operates in the manner earlier described. When the called party at substation 102 hangs up, the adapter opens the called D.C. loop to the switchboard 400.

If the called party at substation 102 hangs up first, the adapter opens the loop to switchboard 400. As a result, switchboard 400 projects busy tone over terminals 407 and 408 to substation 413. When the calling party hangs up, substation 413 opens the calling loop to the switchboard.

C. *Call transfer*

If, during conversation between the calling and called parties at substations 413 and 102, it is determined that the calling party should speak with the party at one of the other substations on party line 105 (substation 104, for example), the party at substation 102 advises the calling party to dial "5," the talking path extending over terminals 403 and 404 through switchboard 400 and terminals 407 and 408 to substation 413. The party at substation 102 will, however, have to stay on the line until the party at substation 104 answers.

When the calling party at substation 413 pushes the key 5, frequencies 2 and 6 are projected over terminals 407 and 408 through switchboard 400 and over terminals 403 and 404 to the adapter of FIGURES 1 and 2, which operates in the manner described above.

D. *Reverting call*

The party at substation 101 can also make a call to the party at substation 104 over switchboard 400. In making such call, the handset is lifted at substation 101, and the substation 101 is connected to switchboard 400, and receives dial tone as described above.

If the calling party keys digits, such as 02, for example, into the switchboard 400, the switchboard equipment makes selection of an idle Tie Trunk 413', for example, of a group of idle tie trunks and projects ringing current over terminals 411 and 412 to the tie trunk. The ringing current via the primary winding of transformer 415A of transformer 415 induces ringing voltage in secondary winding 415B which is extended via conductors 421 and 422 to Ring Tone Detector 417. As a result of ringing current detection, Detector 417 gives out a logic 1 signal to the lower portion of flip-flop 418, and the lower portion of flip-flop 418 gives out a logic 1 signal to gate 419 which conducts to provide a low impedance connection between the mid taps of windings 415A and 414A of transformers 415 and 414, and thereby a D.C. loop back to switchboard 400 to trip the ring. Switchboard 400 then extends connections schematically shown from terminals 401, 402, 403, and 404 to terminals 409, 410, 411, and 412, to effect a connection from terminals 403 and 404 through the transformers of the tie trunk 413' to terminals 401 and 402. At such time, the calling party notices a sizeable increase in sidetone.

Thereupon the calling party pushes his key labeled 5, and tones of frequencies 2 and 6 will issue from his substation, and as described hereinbefore, will pass over conductors 105A and 105B and over terminals 403 and 404 to primary winding 415A. Tones are induced in secondary winding 415B which pass over conductors 421 and 422 to primary winding 414B, inducing tone in secondary winding 414A which passes over terminals 409 and 410 through the switchboard connections to terminals 401 and 402 and thence over conductors 105D and 105C to primary winding 119A of the adapter. Tone induced in secondary winding 119B actuates the adapter to complete the call to substation 104 as described before in conjunction with a reverting call.

When the last party on line 105 hangs up, the loop extending over terminals 401–404 to switchboard 400 is opened and the switchboard releases the connections between terminals 401–404 and 409–412. In that a direct current loop still exists in the tie trunk 413', switchboard 400 sends busy tone to the tie trunk over terminals to primary winding 415A. Tone is extended into secondary winding 415B, and extended over conductors 421 and 422 for detection by Busy Tone Detector 416 which gives out logic signal 1 to the upper portion of flip-flop 418 to reset the flip-flop. Upon reset, the lower portion of the flip-flop changes its output over conductor 425 to gate 419 from logic 1 to logic 0 causing gate 407 to cease conducting, and to thereby open the loop to the switchboard. The switchboard senses the opening of the loop and discontinues busy tone to the tie trunk 413'.

E. *Party line conference calls*

Party line conference calls would be established through switchboard 400 via tie trunk 413' using the tie between the pair of conductors 105C and 105D and the pair 105A and 105B in similar fashion to that described above.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a telephone system having a plurality of four-wire subscriber lines, each of which includes a pair of incoming conductors and a pair of outgoing conductors, a plurality of subscriber substations, each of which has a four-wire circuit, a line adapter circuit for connecting each of said plurality of subscriber substations to a subscriber four-wire line including a mixing circuit having impedance matching means connecting one pair of wires of each of said plurality of substations to the incoming conductors of said subscriber line, and a second set of impedance matching means for connecting a second pair of wires of each of said plurality of substations to the outgoing conductors of said subscriber line, and a third set of impedance matching means connecting the pair of output wires of each substation to the input circuits of each other substation, whereby side tones are substantially minimized in the connection of the plurality of subscriber substations to said single subscriber line.

2. In a telephone system having a four-wire subscriber line including a pair of incoming conductors over which ringing and coded ringing signals are received, a plurality of subscriber substations, a line adapter circuit for connecting said substation to said four-wire subscriber line including a plurality of ringing gates, each of which is operative to connect ringing signals to a different one of said plurality of subscriber substations, ring detector means operative responsive to the receipt of ringing current over said line to couple a reset signal to each of said ringing gates to condition the gates for operation, and selective signal receiver means operative responsive to the receipt of said coded ringing signals thereafter to enable only the one of the conditioned ringing gates which is connected to the subscriber substation on the line identified by the coded ringing signals.

3. A system as set forth in claim 2 which includes means connected to each pair of gates operative as enabled to inhibit operation of each of the other gates.

4. A system as set forth in claim 2 in which each coded ringing signal is comprised of signals of a first and a second frequency, the frequency of each pair of signals for the different substations being different, and which includes a plurality of frequency receivers each of which is operative responsive to receipt of a different frequency signal, and means connecting each of said ringing gates to the output circuit of a different pair of said receivers.

5. In a telephone system having a four-wire subscriber line including a pair of incoming conductors over which ringing and coded ringing signals are received, and a pair of outgoing conductors, a plurality of subscriber substations, a line adapter circuit for connecting said substation to said four-wire subscriber line including a plurality of ringing gates, each of which is operative to connect ringing signals to a different one of said subscriber substations, ring detector means operative responsive to the receipt of ringing current over said line to couple a reset signal to each of said ringing gates to condition the gates for operation, selective signal receiver means operative responsive to the receipt of the coded ringing signals thereafter to enable only the one of the conditioned ringing gates identified by the coded ringing signal to couple ringing signals to the desired subscriber substation, and ring-back means operative to concurrently transmit ring-back tone over said outgoing conductors.

6. A system as set forth in claim 5 in which each subscriber substation includes control means for initiating and answering calls, including means connected to terminate operation of said ring-back means responsive to answering of a call at the substation.

7. In a telephone system having a four-wire subscriber line including a pair of incoming conductors over which coded ringing signals are received, and a pair of outgoing conductors, a plurality of subscriber substations, each of which includes control means for initiating, answering, and terminating calls, a line adapter circuit for selectively connecting each of said subscriber substations to said four-wire subscriber line responsive to receipt of its assigned coded ringing signal and answer of the call by the called party, means in said system operative to transmit a busy tone signal over said incoming conductors responsive to termination of the connection by the calling party, busy detector means in said line adapter circuit operative responsive to receipt of said busy tone signal to condition said line adapter circuit for reset, and means operated in response to operation of said control means by said called party thereafter to reset said adapter circuit.

8. In a telephone system having a four-wire subscriber line which includes a pair of incoming conductors and a pair of outgoing conductors, a plurality of subscriber substations, each of which has control means for use in initiating, answering and terminating calls, and a line adapter circuit for selectively connecting a called one of said plurality of subscriber substations to said subscriber four-wire line responsive to receipt of a predetermined signal from a calling one of said substations and answer by the called one of said substations including means operative responsive to receipt thereafter of a second predetermined signal over said incoming conductors during said connection to couple a ringing signal to a further one of said subscriber substations, and means responsive to operation of the control means at said further substation to connect said further substation in said connection which includes said first called substation.

9. A system as set forth in claim 8 in which said line adapter circuit includes means for holding said connection subsequent to disconnection of said first called substation by operation of the control means at the first called substation.

10. A system as set forth in claim 8 in which said line adapter circuit includes means for transmitting a ring back tone over said outgoing conductors concurrently with coupling of said ringing signal to said further subscriber substation.

11. A system as set forth in claim 8 in which said calling subscriber substation includes means for transmitting said first and second predetermined signal over said incoming conductors.

12. In a telephone system having a four-wire subscriber line which includes a pair of incoming conductors and a pair of outgoing conductors, a plurality of subscriber substations, each of which has a four-wire circuit, and control means for use in initiating and answering calls received over associated switching equipment, and signalling means; and a line adapter circuit for connecting at least two wires of each of said plurality of subscriber substations over the pair of outgoing conductors of said one subscriber four-wire line to said associated switching equipment including means operative responsive to operation of said control means in any one of said plurality of subscriber substations to complete a connection from said one substation over said outgoing pair of conductors to said associated equipment and the pair of incoming conductors of said four-wire subscriber line, and means operative responsive to transmission of signals over said connection by said signalling means at said one station to selectively couple ringing current to only a second one of said substations which are connectable to said four-wire subscriber line.

13. A system as set forth in claim 12 in which said line adapter circuit includes means for coupling ring back tone to said one substation concurrently with said transmission of ringing current to said second substation.

14. A system as set forth in claim 12 in which said line adapter circuit includes gate means for each of said substations having access over said plurality of lines, each of said gate means being connected to block ringing current from the calling one of the substations in a call over the incoming conductors of said line.

15. A system as set forth in claim 12 in which said line adapter means includes means operative responsive to receipt of a second set of signals during ringing of a desired one of said plurality of substations to terminate said ringing current.

16. A system as set forth in claim 12 in which said line adapter means includes means for connecting said second substation to said line responsive to operation of the control means thereat in answer to the ringing signals.

17. In a telephone system having a switchboard including a tie trunk, a four-wire subscriber line connected to said switchboard over a pair of incoming conductors and a pair of outgoing conductors, a plurality of subscriber substations, each of which has a four-wire circuit, a line adapter circuit for selectively connecting each of said plurality of subscriber substations to said subscriber four-wire line, means in said switchboard for establishing a reverting call between at least a first and a second subscriber substation of said plurality over the incoming and outgoing conductor pair of said four-wire subscriber line, including means in said switchboard operative to transmit ringing current to said tie trunk responsive to receipt of a predetermined signal from a calling one of said subscriber substations, ring tone detector means in said tie trunk operative to extend the connection from said ringing conductor pair over the switchboard and tie trunk and said incoming conductor pair to said line adapter circuit, means in said line adapter circuit for signalling the desired called substation responsive to transmission of a further signal by the calling substation, means in said switchboard for extending a busy tone over said connection to the tie trunk with release of the connection by each of the substations in the call, and busy detector means in said tie trunk operative to interrupt the connection between the tie trunk and the switchboard responsive to detection of a busy tone signal.

References Cited by the Examiner

UNITED STATES PATENTS 3,061,685 10/1962 Peach ............. 179—18.9

KATHLEEN H. CLAFFY, *Primary Examiner.*

ROBERT H. ROSE, *Examiner.*

S. J. BOR, *Assistant Examiner.*